United States Patent
Becoulet et al.

(10) Patent No.: US 12,435,672 B2
(45) Date of Patent: *Oct. 7, 2025

(54) FLEXIBILITIES IN A GAS TURBINE ENGINE WITH SPEED REDUCER

(71) Applicant: Safran Aircraft Engines, Paris (FR)

(72) Inventors: Julien Fabien Patrick Becoulet, Moissy-Cramayel (FR); Maxime Paul Numa Givert, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/690,549

(22) PCT Filed: Sep. 7, 2022

(86) PCT No.: PCT/FR2022/051689
§ 371 (c)(1),
(2) Date: Mar. 8, 2024

(87) PCT Pub. No.: WO2023/037074
PCT Pub. Date: Mar. 16, 2023

(65) Prior Publication Data
US 2025/0137407 A1     May 1, 2025

(30) Foreign Application Priority Data
Sep. 10, 2021   (FR) .................................. FR2109526

(51) Int. Cl.
*F02C 7/36*      (2006.01)

(52) U.S. Cl.
CPC .......... *F02C 7/36* (2013.01); *F05D 2220/323* (2013.01); *F05D 2240/54* (2013.01);
(Continued)

(58) Field of Classification Search
CPC .... F02C 7/36; F02C 3/107; F02K 3/06; F05D 2260/40311; F05D 2260/941; F05D 2240/54; F05D 2220/323
See application file for complete search history.

(56) References Cited

U.S. PATENT DOCUMENTS 10,808,626 B1 * 10/2020 Spruce ..................... F02C 7/06
10,837,370 B1    11/2020 Spruce
(Continued)

FOREIGN PATENT DOCUMENTS

EP      3 002 433 A1    4/2016
EP      3 832 101 A1    6/2021
(Continued)

OTHER PUBLICATIONS

French Search Report of the International Searching Authority for International Application No. FR2109526, dated Sep. 10, 2021.
(Continued)

*Primary Examiner* — Elton K Wong
(74) *Attorney, Agent, or Firm* — BIRCH, STEWART, KOLASCH & BIRCH, LLP

(57) ABSTRACT

Disclosed is an assembly for a turbomachine that includes connection elements having respective radial flexibilities, wherein a ratio of a first of the respective radial flexibilities to a third of the respective radial flexibilities is strictly lower than 10% and/or a ratio of the first of the respective radial flexibilities to a second of the respective radial flexibilities is strictly lower than 4%.

13 Claims, 3 Drawing Sheets

(52) U.S. Cl.
CPC .............. *F05D 2260/40311* (2013.01); *F05D 2260/941* (2013.01)

(56) References Cited

U.S. PATENT DOCUMENTS

| | | | | |
|---|---|---|---|---|
| 2013/0287575 A1* | 10/2013 | McCune | .................... | F02K 3/06 |
| | | | | 416/170 R |
| 2017/0211484 A1* | 7/2017 | Sheridan | .................... | F02C 7/36 |
| 2021/0262395 A1* | 8/2021 | Spruce | ..................... | F16C 1/02 |
| 2024/0410319 A1* | 12/2024 | Becoulet | ................... | F02C 7/36 |

FOREIGN PATENT DOCUMENTS

| | | |
|---|---|---|
| EP | 3 832 112 A1 | 6/2021 |
| WO | WO 2015/156885 A2 | 10/2015 |

OTHER PUBLICATIONS

International Search Report and Written Opinion of the International Searching Authority for International Application No. PCT/FR2022/051689, dated Jan. 18, 2023.

* cited by examiner

FLEXIBILITIES IN A GAS TURBINE ENGINE WITH SPEED REDUCER

FIELD OF THE INVENTION

The present invention relates to a gas turbine engine comprising a mechanical transmission device.

More specifically, the present invention relates to the radial flexibility of the mechanical transmission device.

BACKGROUND

With reference to FIG. 1, a gas turbine engine 100 having a geared architecture is known from the background, the gas turbine engine 100 being centered on a longitudinal axis X-X. Such a gas turbine engine 100 is in particular used for the propulsion of an aircraft (not represented) onto which it is fixedly mounted.

As illustrated in FIG. 1, the gas turbine engine 100 comprises a fan 101 surrounded by a fairing 102. Furthermore, the gas turbine engine 100 comprises a casing 1 surrounding a low-pressure compressor section 103, a high-pressure compressor section 104, a combustion chamber 105, a high-pressure turbine section 106 and a low-pressure turbine section 107.

The gas turbine engine 100 also comprises a fan shaft 2, a low-pressure turbine shaft 4 and a high-pressure turbine shaft 108, each shaft being movable in rotation relative to the casing 1 about the longitudinal axis X-X. The fan shaft 2 is supported in rotation by a pair of bearings 3 fixedly mounted on the casing 1.

The fan shaft 2 drives the fan 101, the low-pressure turbine shaft 4 is driven by the low-pressure turbine section 107 and drives the low-pressure compressor section 103, and the high-pressure turbine shaft 108 is driven by the high-pressure turbine section 106 and drives the high-pressure compressor section 104.

As visible in FIG. 1, the gas turbine engine 100 also comprises a mechanical transmission device 6, otherwise called reduction gearbox.

In operation, an air stream is sucked by the fan 101 within the gas turbine engine 100. Part of this stream circulates within the casing 1 to be, successively, compressed by the low-pressure compressor section 103 then the high-pressure compressor section 104, ignited within the combustion chamber 105, and finally expanded by the high-pressure turbine section 106 then the low-pressure turbine section 107.

This circulation makes it possible to drive in rotation the low-pressure turbine shaft 4 and the high-pressure turbine shaft 108 about the longitudinal axis X-X. Furthermore, the low-pressure turbine shaft 4 drives the fan shaft 2 via the mechanical transmission device 6, which transmits a torque and a rotational speed from the low-pressure turbine shaft 4 to the fan shaft 2. The dynamic decoupling of the fan shaft 2 and of the low-pressure turbine shaft 4, enabled by the mechanical transmission device 6, allows the low-pressure turbine shaft 4 to reach much higher rotational speeds, without risking overspeed at the end of the fan blades 101. Hence, the efficiency of the gas turbine engine 100 is improved, and its size can be reduced.

The use of a mechanical transmission device 6 nevertheless poses a certain number of difficulties, including the mechanical stability of the mechanical transmission device 6 in operation, which directly influences its efficiency and its lifespan.

Indeed, in operation, the different components of the gas turbine engine 100 are likely to follow dynamic evolutions that are different from each other. For example, the fan shaft 2 is likely to be subject to movements whose intensity and direction are different from movements to which the low-pressure turbine shaft 4 is likely to be subject. As the fan shaft 2 and the low-pressure turbine shaft 4 are mechanically linked to the mechanical transmission device 6, the latter is then likely to accumulate stresses in order to compensate for these different dynamic evolutions. Typically, the low-pressure turbine shaft 4 may be subject to a radial displacement, while the fan shaft 2 remains fixed radially. In this case, it is the mechanical transmission device 6 that dampens this difference in the radial movement, by accumulating radial mechanical stresses.

A solution to take into account this difficulty would be to strengthen the components of the mechanical transmission device 6 in order to be able to withstand these stresses throughout the lifespan of the gas turbine engine 100. This solution is however not satisfactory because it is expensive and leads to an increase in the mass of the gas turbine engine 100 which is such that the efficiency improvement authorized by the reduction gear architecture is annihilated.

Another solution to take into account this difficulty consists in trying to limit the stiffness of certain parts of the mechanical transmission device 6, and in particular to limit the stiffness of the elements 8, 9 supporting the mechanical transmission device 6. Values of ratios between stiffnesses of these elements 8, 9 and stiffnesses of the support 109 have thus been proposed, making it possible to limit the accumulation of the stresses within the mechanical transmission device 6. This solution is also not satisfactory. Indeed, it is generally not clear from this solution what portion of these elements 8, 9 must be made less stiff, nor the way in which this stiffness decrease can be measured. Therefore, the ratio values that have been proposed are in reality of no help in improving the lifespan of the mechanical transmission device 6, while limiting its weight.

There is therefore a need to overcome the drawbacks of the state of the art.

DISCLOSURE OF THE INVENTION

One aim of the invention is to reduce the mechanical stresses within a mechanical transmission device of a geared gas turbine engine.

To this end, according to a first aspect of the invention, an assembly for a gas turbine engine is proposed, comprising:
  a casing,
  a fan shaft movable in rotation relative to the casing about a longitudinal axis of the gas turbine engine,
  a first bearing configured to support in rotation the fan shaft, the first bearing being fixedly mounted on the casing,
  a turbine shaft movable in rotation relative to the casing about the longitudinal axis,
  a second bearing configured to support in rotation the turbine shaft, the second bearing being fixedly mounted on the casing,
  a mechanical transmission device, the turbine shaft driving the fan shaft via the mechanical transmission device,
  a first connection element having a first end connected to the fan shaft and mounted on the first bearing, and a second end connected to the mechanical transmission device, the first connection element having a first radial flexibility, a second connection element having a third end connected to the turbine shaft and mounted on the second bearing, and a fourth end connected to the mechanical transmission device, the second connection element having a second radial flexibility, and a third connection element having a fifth end fixedly mounted on the casing and a sixth end connected to the mechanical transmission device, the third connection element having a third radial flexibility, wherein a ratio between the first radial flexibility and the third radial flexibility is strictly less than 10% and/or a ratio between the first radial flexibility and the second radial flexibility is strictly less than 4%.

Keeping the ratio between the first radial flexibility and the third radial flexibility strictly less than 10% and/or the ratio between the first radial flexibility and the second radial flexibility strictly less than 4% ensures a distribution of the radial stresses between the connection elements which is optimal, which effectively reduces the mechanical stresses, in particular radial mechanical stresses, within the mechanical transmission device. Wear of the mechanical transmission device is therefore reduced, and its lifespan is extended. Furthermore, the efficiency of the gas turbine engine is improved.

Advantageously, but optionally, the assembly according to the invention can comprise at least one of the following characteristics, taken alone or in combination:

- the mechanical transmission device is an epicyclic gear train comprising a ring gear, a plurality of planet gears supported by a carrier and a sun gear,
- the second end is mounted on the ring gear which is movable in rotation about the longitudinal axis, the fourth end is mounted on the sun gear which is movable in rotation about the longitudinal axis, and the sixth end is mounted on the carrier,
- the second end is mounted on the carrier which is movable in rotation about the longitudinal axis, the fourth end is mounted on the sun gear which is movable in rotation about the longitudinal axis, and the sixth end is mounted on the ring gear,
- the second bearing is a rolling comprising a row of balls or a row of rollers,
- the second radial flexibility is greater than or equal to $20 \cdot 10^{-9}$ m·N$^{-1}$, for example between $50 \cdot 10^{-9}$ m·N$^{-1}$ and $200 \cdot 10^{-9}$ m·N$^{-1}$, and is preferably $100 \cdot 10^{-9}$ m·N$^{-1}$, and
- the third radial flexibility is comprised between $350*10^{-9}$ m·N$^{-1}$ and $1{,}500 \cdot 10^{-9}$ m·N$^{-1}$, for example between $500 \cdot 10^{-9}$ m·N$^{-1}$ and $1{,}000 \cdot 10^{-9}$ m·N$^{-1}$, and is preferably $800 \cdot 10^{-9}$ m·N$^{-1}$.

According to a second aspect of the invention, a gas turbine engine is proposed comprising an assembly as previously described.

According to a third aspect of the invention, an aircraft comprising a gas turbine engine as previously described is proposed.

DESCRIPTION OF THE FIGURES

Other characteristics, aims and advantages of the invention will emerge from the following description which is purely illustrative and not limiting and which should be read with reference to the appended drawings in which.

In all the figures, similar elements bear identical references.

DETAILED DESCRIPTION OF THE INVENTION

Figure 1:
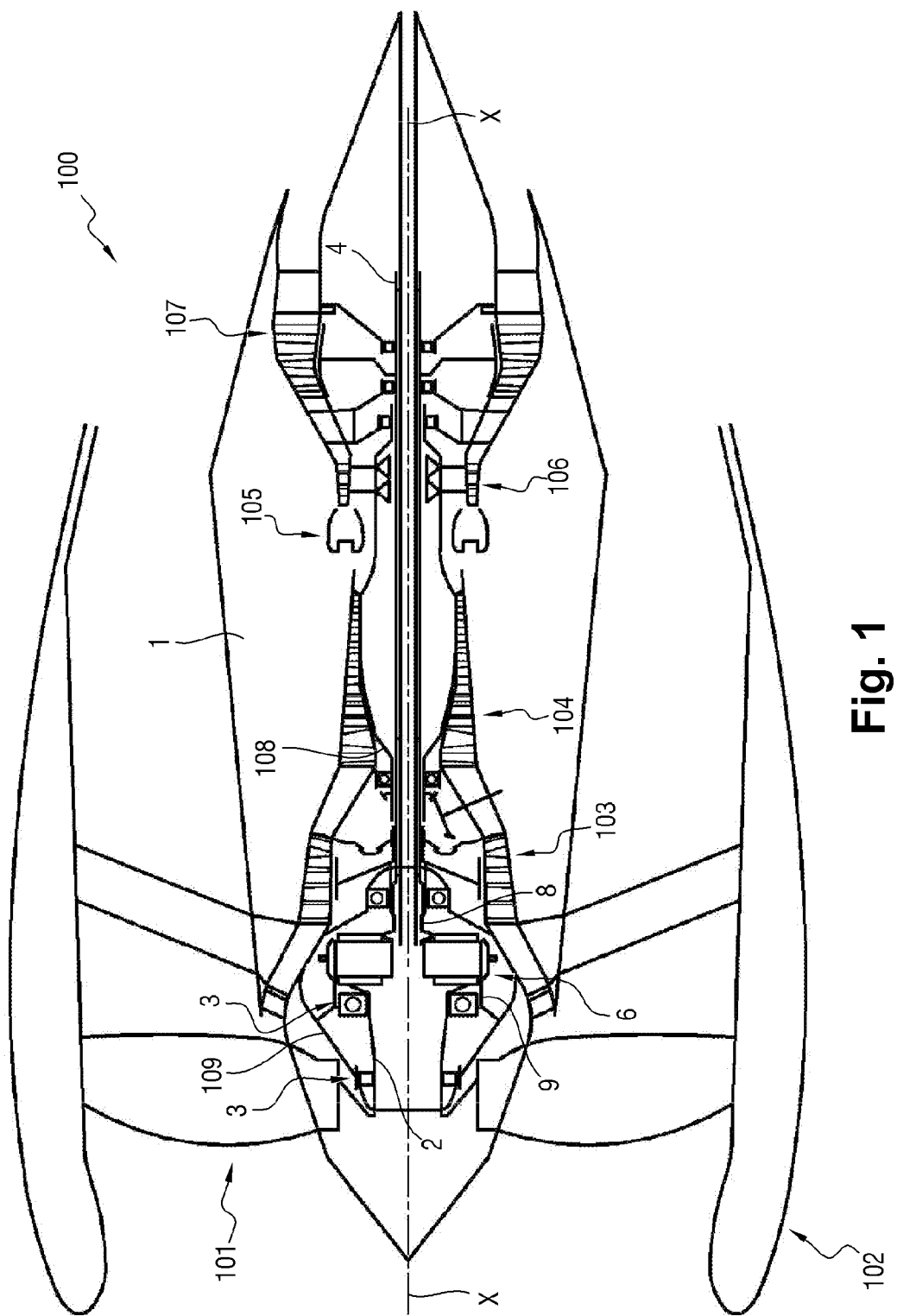
FIG. 1, already described, is a sectional view of a geared gas turbine engine known from the background.
Figure 2:
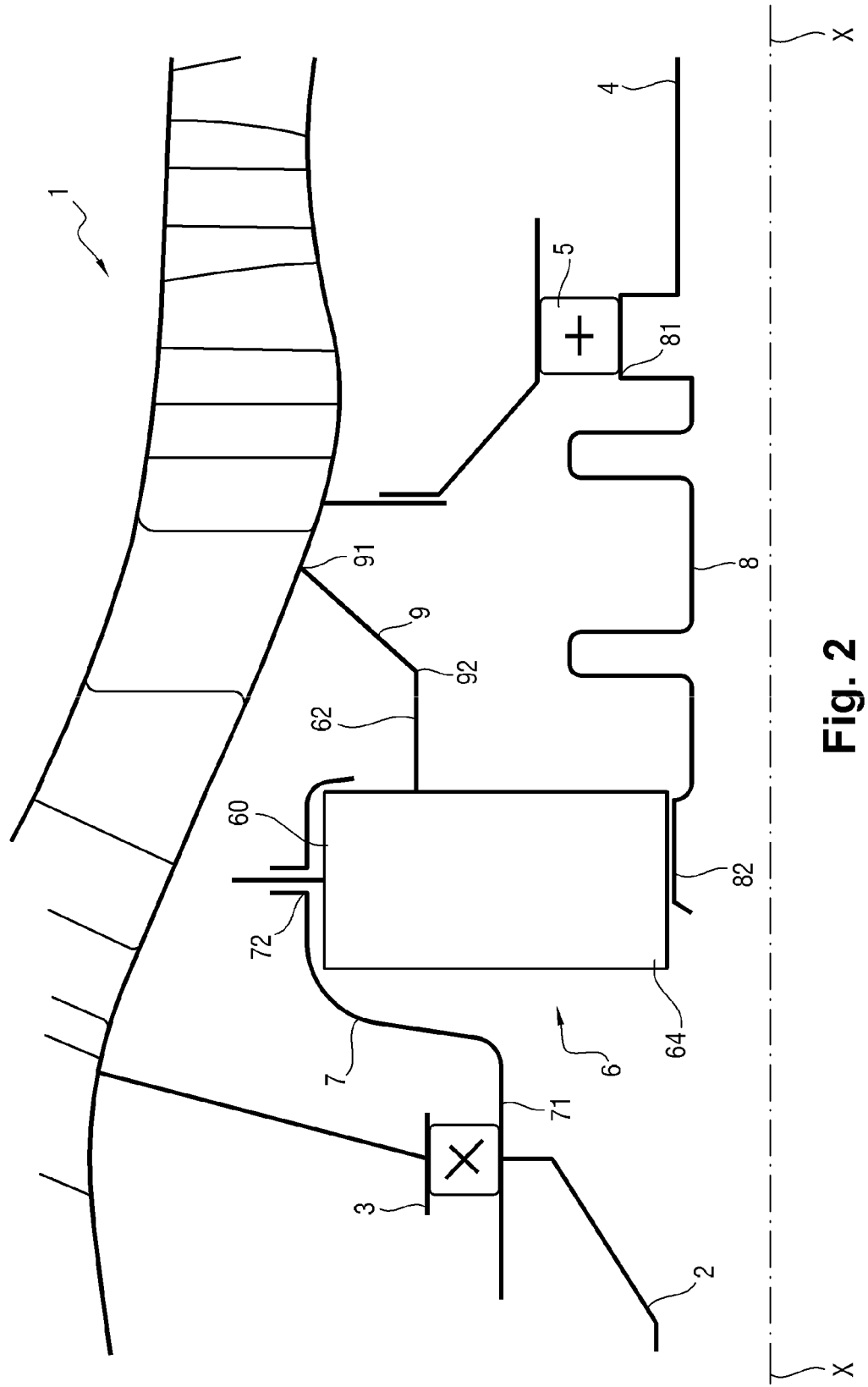
FIG. 2 is a sectional view of one embodiment of a gas turbine engine assembly according to the invention.
Figure 3:
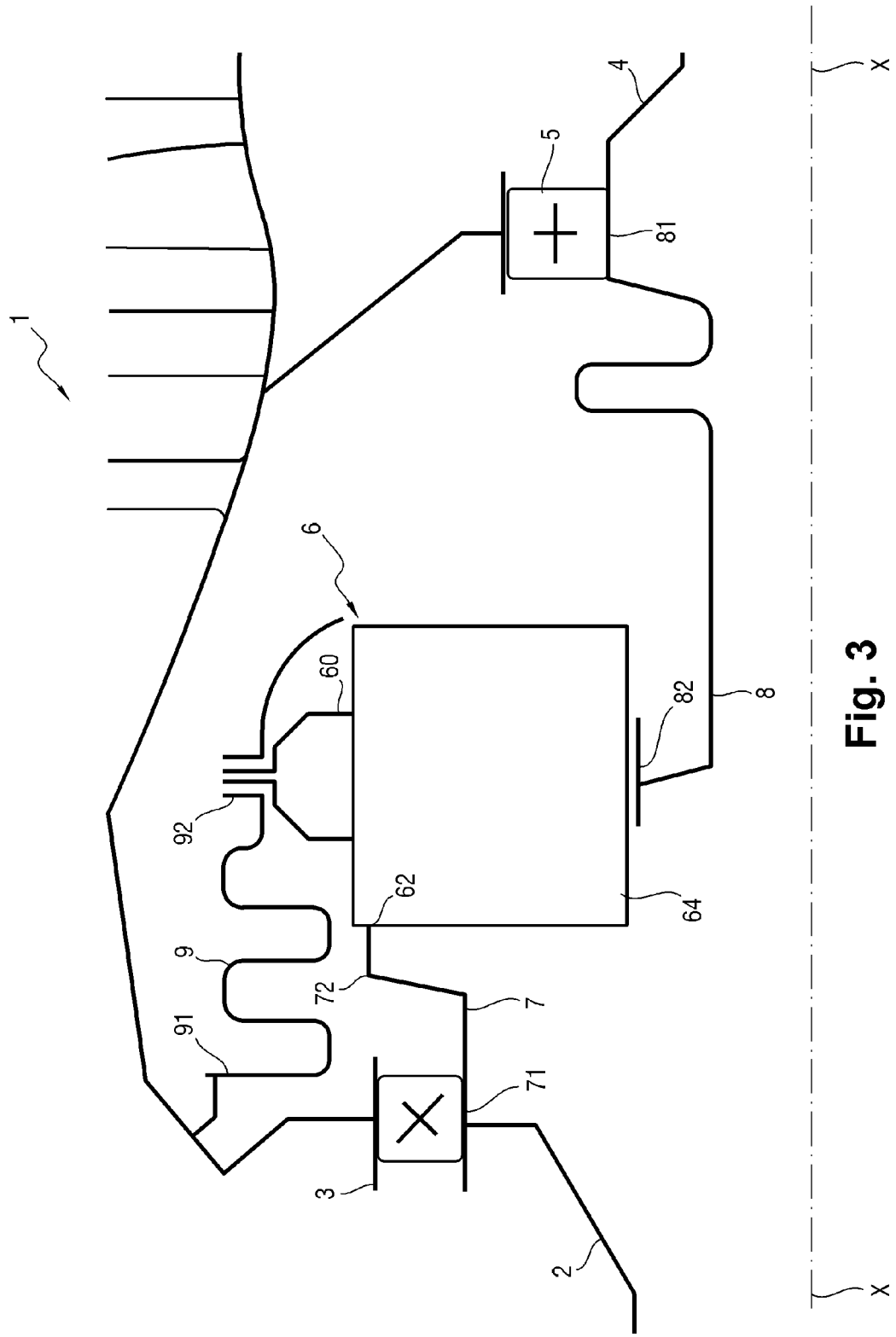
FIG. 3 is a sectional view of one embodiment of a gas turbine engine assembly according to the invention.

FIGS. 2 and 3 each illustrate one embodiment of part of a geared gas turbine engine 100. The elements of this gas turbine engine 100 which do not appear in FIGS. 2 and 3 are similar to the corresponding elements of the gas turbine engine illustrated in FIG. 1, already described. Of course, the present disclosure is not limited to the geared gas turbine engines 100 such as the one illustrated in FIG. 1. Indeed, the present disclosure is for example applicable to the geared gas turbine engines 100 comprising more than two spools, typically three spools, but also to the geared gas turbine engines 100 whose fan 101 is unducted.

In the present text, the upstream and the downstream are defined in relation to the normal air flow direction through the gas turbine engine 100 in operation. Likewise, an axial direction corresponds to the direction of the longitudinal axis X-X, a radial direction refers to a direction which is perpendicular to this longitudinal axis X-X and passes therethrough, and a circumferential or tangential direction corresponds to the direction of a planar and closed curved line, all points of which are equidistant from the longitudinal axis X-X. Moreover, and unless otherwise specified, the terms "inner (or internal)" and "outer (or external)", respectively, are used in reference to a radial direction so that the inner (i.e. radially internal) part or surface of an element is closer to the longitudinal axis X-X than the outer (i.e. radially external) part or surface of the same element.

With reference to FIGS. 2 and 3, the mechanical transmission device 6 is preferably an epicyclic gear train comprising a ring gear 60, a plurality of planet gears supported by a carrier 62 and a sun gear 64.

Furthermore, a first bearing 3 is arranged downstream of the fan shaft 2 and fixedly mounted on the casing 1. Advantageously, the first bearing 3 is a rolling comprising a row of balls, in order to effectively take up the forces exerted on the fan shaft 2. Thus, the first bearing 3 comprises a first ring and a second ring, coaxial and centered on the longitudinal axis X-X, between which at least one row of balls is placed. The first ring is fixedly mounted on the casing 1 and the second ring is fixedly mounted on the fan shaft 2.

Moreover, a second bearing 5 is fixedly mounted on the casing 1 and configured to support in rotation the turbine shaft 4, upstream of the latter. Advantageously, the second bearing 5 is a rolling comprising a row of balls or a row of rollers, in order to effectively take up the forces exerted upstream of the turbine shaft 4. Thus, the second bearing 5 comprises a third ring and a fourth ring, coaxial and centered on the longitudinal axis X-X, between which a row of balls or rollers is placed. The third ring is fixedly mounted on the casing 1 and the fourth ring is fixedly mounted on the turbine shaft 4.

As visible in each of FIGS. 2 and 3, a first connection element 7 connects the fan shaft 2 to the mechanical transmission device 6. The first connection element 7 is centered on the longitudinal axis X-X. More specifically, the first connection element 7 has a first end 71 connected to the fan shaft 2 and a second end 72 connected to the mechanical transmission device 6. In fact, the first end 71 is mounted on the first bearing 3.

Furthermore, a second connection element 8 connects the turbine shaft 4 to the mechanical transmission device 6. The second connection element 8 is also centered on the longitudinal axis X-X. In addition, the second connection element 8 has a third end 81 connected to the turbine shaft 4 and a fourth end 82 connected to the mechanical transmission device 6. In fact, the third end 81 is mounted on the second bearing 5.

Moreover, a third connection element 9, centered on the longitudinal axis X-X, connects the mechanical transmission device 6 to the casing 1. More specifically, the third connection element 9 has a fifth end 91 fixedly mounted on the casing 1 and a sixth end 92 connected to the mechanical transmission device 6.

In the embodiment illustrated in FIG. 2, the second end 72 is mounted, preferably fixedly mounted, on the ring gear 60 which is movable in rotation about the longitudinal axis X-X, the fourth end 82 is mounted, preferably fixedly mounted, on the sun gear 64 which is movable in rotation about the longitudinal axis X-X, and the sixth end 92 is mounted, preferably fixedly mounted, on the carrier 62.

In the embodiment illustrated in FIG. 3, the second end 72 is mounted, preferably fixedly mounted, on the carrier 62 which is movable in rotation about the longitudinal axis X-X, the fourth end 82 is mounted, preferably fixedly mounted, on the sun gear 64 which is movable in rotation about the longitudinal axis X-X, and the sixth end 92 is mounted, preferably fixedly mounted, on the ring gear 60.

The first connection element 7 has a first radial flexibility SR1, the second connection element 8 has a second radial flexibility SR2 and the third connection element 9 has a third radial flexibility SR3.

The radial flexibility SR1, SR2, SR3 of a connection element 7, 8, 9 is defined intrinsically, that is to say by considering the connection element 7, 8, 9 as such, apart from the gas turbine engine 100, that is to say before or after being mounted in the latter. In this way, it is possible to dimension each connection element 7, 8, 9 absolutely, which makes it possible to integrate it into any gas turbine engine 100.

Thus, the radial flexibility SR1, SR2, SR3 of a connection element 7, 8, 9 is defined by assimilating the connection element 7, 8, 9 to a beam embedded at one end 71, 81, 91, and free from being subject to radial movements at the other end 72, 82, 92. In fact, this corresponds to the conditions in which the connection element 7, 8, 9 is biased within the gas turbine engine 100. For example, the first connection element 7 is less free from being subject to radial movements relative to the casing 1 at the first end 71 than at the second end 72. Hence, the radial flexibility SR1, SR2, SR3 of a connection element 7, 8, 9 is defined as a ratio between, on the one hand, a radial displacement of the free end 72, 82, 92 relative to the embedded end 71, 81, 91, which free end 72, 82, 92 being subjected to a loading in a radial direction, typically a tensile and/or compressive loading and, on the other hand, the force, typically tensile and/or compressive force, applied at the free end 72, 82, 92 to generate this radial displacement.

Such radial flexibility SR1, SR2, SR3 can for example be measured on a test bench, by embedding one of the ends 71, 72, 81, 82, 91, 92 of the connection element 7, 8, 9, then by radially biasing the other end 71, 72, 81, 82, 91, 92. The choice of the end 71, 72, 81, 82, 91, 92 to be embedded has no importance to the extent that the radial flexibility SR1, SR2, SR3 of a connection element 7, 8, 9 is associated with a relative displacement between the two ends 71, 72, 81, 82, 91, 92 of the connection element 7, 8, 9. Therefore, it does not matter whether the end 71, 72, 81, 82, 91, 92 embedded during the measurement is actually the end 71, 81, 91 which, during the operation of the gas turbine engine 100, is subject to radial movements relative to the casing 1 which are smaller compared to the other end 72, 82, 92 of the connection element 7, 8, 9. In any case, it is possible to take into account, for calculating the radial flexibility SR1, SR2, SR3 of a connection element 7, 8, 9, the relative radial displacements between the free end 72, 82, 92 and the embedded end 71, 81, 91. In fact, within the gas turbine engine 100, none of the first end 71, the third end 81 or the fifth end 91 is strictly radially immobile relative to the casing 1.

For example, the first radial flexibility SR1 is measured by removing the first connection element 7 from the gas turbine engine 100, placing it on a test bench, embedding the first end 71, and radially biasing the second end 72, typically via a tensile and/or compressive loading in a radial direction. The radial displacement of the free end 72, 82, 92 relative to the embedded end 71, 81, 91, which is associated with each of the radial forces applied at the free end 72, 82, 92, is then noted. Then a regression, for example of linear type, is carried out on all the points noted, and the radial flexibility SR1, SR2, SR3 of the connection element 7, 8, 9 is determined, typically as the director coefficient of the straight line obtained by linear regression. Of course, it is not necessarily required to use a test bench, since such measurements can also be carried out by computer-assisted digital simulation, typically by isolating the first connection element 7 from the rest of the gas turbine engine 100, and by simulating the embedding and the bias already described.

By taking into account relations between the radial flexibilities SR1, SR2, SR3 when dimensioning the connection elements 7, 8, 9, it is possible to relieve the mechanical transmission device 6 of its role of damping the relative radial movements of the fan shaft 2 and/or of the mechanical transmission device 6 and/or of the turbine shaft 4. Indeed, thanks to a certain radial flexibility SR1, SR2, SR3 of the connection elements 7, 8, 9, the radial displacements of the different components within the mechanical transmission device 6 are limited, which further reduces the mechanical stresses within the mechanical transmission device 6. Hence, the wear of the mechanical transmission device 6 is reduced and its lifespan extended, without it being necessary to strengthen the mechanical transmission device 6, that is to say, to make it heavier.

Of course, the mechanical biases exerted on the mechanical transmission device 6 by the fan shaft 2 and the turbine shaft 4 are not limited to a radial direction. In fact, the fan shaft 2 and the turbine shaft 4 are also subject to axial movements and circumferential movements (i.e. torsional), which are just as likely to induce stresses in the mechanical transmission device 6.

In any case, the first radial flexibility SR1 is the lowest of the radial flexibilities. This is explained by the fact that the first connection element 7 is the one having a diameter (see FIG. 2) and/or a radial thickness (see FIG. 3) which is the largest of all the connection elements 7, 8, 9. Furthermore, this is explained by the intensity of the forces to which the first connection element 7 is subjected, in particular coming from the fan 101. Consequently, when dimensioning this part of the gas turbine engine 100, the first connection element 7 is chosen as a reference to determine the second radial flexibility SR2 and the third radial flexibility SR3. Thus, in operation, it is the radial movements of the second end 72 that control the radial movements of the fourth end 82 and the sixth end 92.

Furthermore, taking the first connection element 7 as a reference to determine the second radial flexibility SR2 and the third radial flexibility SR3 has proven to be more relevant than taking the support 109 of the first bearing 3, as recommended in the background. In fact, the first connection element 7 is closer to the mechanical transmission device 6 than is the support 109. Consequently, it is possible to access a finer dimensioning of the radial flexibilities SR1, SR2, SR3. This offers greater freedom in dimensioning the rest of the gas turbine engine 100, which facilitates the design and reduces time and cost.

However, it is possible to consider the radial flexibility of the assembly formed by the first connection element 7, the first bearing 3 and the support 109, or of the assembly formed by the first connection element 7 and the fan shaft 2, as a reference for determining the second radial flexibility SR2 and the third radial flexibility SR3. The definition of the radial flexibility of such assemblies is the same as the one already described for the first radial flexibility SR1. Furthermore, the method for measuring the radial flexibility of such assemblies follows the same protocol as the one already described for the first radial flexibility. Typically, one of the ends of such an assembly, typically one of the axial ends, is embedded, while the other end, typically the other axial end, is subjected to a radial bias. Corresponding displacements and radial forces are noted then correlated to determine the radial flexibility of the assembly which will then serve as a reference to determine the second radial flexibility SR2 and the third radial flexibility SR3.

In any event, the first radial flexibility SR1 or, more generally, the radial flexibility of one of the assemblies already described, is strictly lower than the third radial flexibility SR3, and the third radial flexibility SR3 is strictly lower than the second radial flexibility SR2. This is in particular achieved by ensuring that the second connection element 8 has a smaller diameter than the first connection element 7 and the third connection element 9. Furthermore, the fan shaft 2 and the support 109 are dimensioned very rigidly to be able to withstand the imbalances of the fan 101 during the operation of the gas turbine engine 100. Consequently, it is easier to dimension the connection elements 7, 8, 9 relative to each other by setting this order of the radial flexibilities SR1, SR2, SR3 as a design constraint.

More specifically, a ratio between the first radial flexibility SR1 (or the radial flexibility of one of the assemblies already described) and the third radial flexibility SR3 is strictly less than 10%. In other words, the third radial flexibility SR3 is strictly greater than ten (10) times the first radial flexibility SR1 (or the radial flexibility of one of the assemblies already described). Alternatively, or additionally, a ratio between the first radial flexibility SR1 (or the radial flexibility of one of the assemblies already described) and the second radial flexibility SR2 is strictly less than 4%. In other words, the second radial flexibility SR2 is strictly greater than twenty-five (25) times the first radial flexibility SR1 (or the radial flexibility of one of the assemblies already described).

These different ratio values make it possible to ensure good distribution of the radial stresses between the second connection element 8 and the third connection element 9 when the second end 72 biases the mechanical transmission device 6 in a radial movement.

These relations between the radial flexibilities can thus serve as a guide during the dimensioning of this part of the gas turbine engine 100. Indeed, by ensuring that these relations are met during the design of the gas turbine engine 100, it is possible to guarantee a reduction of the mechanical stresses within the mechanical transmission device 6 and hence, an increase in its lifespan and an improvement in the efficiency of the gas turbine engine 100.

In one advantageous embodiment, the second radial flexibility SR2 is greater than or equal to $20 \cdot 10^{-9}$ m·N$^{-1}$, typically between $50 \cdot 10^{-9}$ m·N$^{-1}$ and $200 \cdot 10^{-9}$ m·N$^{-1}$, and is preferably $100 \cdot 10^{-9}$ m·N$^{-1}$. Furthermore, the third radial flexibility SR3 is comprised between $350*10^{-9}$ m·N$^{-1}$ and $1,500 \cdot 10^{-9}$ m·N$^{-1}$, typically between $500 \cdot 10^{-9}$ m·N$^{-1}$ and $1,000 \cdot 10^{-9}$ m·N$^{-1}$, and is preferably $800 \cdot 10^{-9}$ m·N$^{-1}$.

The invention claimed is:

1. An assembly comprising:
   a casing;
   a fan shaft movable in rotation relative to the casing about a longitudinal axis;
   a first bearing configured to support in rotation the fan shaft and fixedly mounted on the casing;
   a turbine shaft movable in rotation relative to the casing about the longitudinal axis;
   a second bearing configured to support in rotation the turbine shaft and fixedly mounted on the casing;
   a mechanical transmission device, the turbine shaft driving the fan shaft via the mechanical transmission device;
   a first connection element having a first end connected to the fan shaft and mounted on the first bearing, a second end connected to the mechanical transmission device, and a first radial flexibility;
   a second connection element having a third end connected to the turbine shaft and mounted on the second bearing, a fourth end connected to the mechanical transmission device, and a second radial flexibility; and
   a third connection element having a fifth end fixedly mounted on the casing, a sixth end connected to the mechanical transmission device, and a third radial flexibility;
   wherein a ratio between the first radial flexibility and the third radial flexibility is strictly less than 10% and/or a ratio between the first radial flexibility and the second radial flexibility is strictly less than 4%.

2. The assembly of claim 1, wherein the mechanical transmission device is an epicyclic gear train comprising a ring gear, a plurality of planet gears supported by a carrier, and a sun gear.

3. The assembly of claim 2, wherein the second end is mounted on the ring gear which is movable in rotation about the longitudinal axis, the fourth end is mounted on the sun gear which is movable in rotation about the longitudinal axis, and the sixth end is mounted on the carrier.

4. The assembly of claim 2, wherein the second end is mounted on the carrier which is movable in rotation about the longitudinal axis, the fourth end is mounted on the sun gear which is movable in rotation about the longitudinal axis, and the sixth end is mounted on the ring gear.

5. The assembly of claim 1, wherein the second bearing is a rolling bearing comprising a row of balls or a row of rollers.

6. The assembly of claim 1, wherein the second radial flexibility is greater than or equal to $20 \times 10^{-9}$ m·N$^{-1}$.

7. The assembly of claim 6, wherein the second radial flexibility is comprised between $50 \times 10^{-9}$ m·N$^{-1}$ and $200 \times 10^{-9}$ m·N$^{-1}$.

8. The assembly of claim 7, wherein the second radial flexibility is $100 \times 10^{-9}$ m·N$^{-1}$.

9. The assembly of claim 1, wherein the third radial flexibility is comprised between $350 \times 10^{-9}$ m·N$^{-1}$ and $1,500 \times 10^{-9}$ m·N$^{-1}$.

10. The assembly of claim 9, wherein the third radial flexibility is comprised between $500 \times 10^{-9}$ m·N$^{-1}$ and $1,000 \times 10^{-9}$ m·N$^{-1}$.

11. The assembly of claim 10, wherein the third radial flexibility is $800 \times 10^{-9}$ m·N$^{-1}$.

12. A gas turbine engine comprising a fan, a turbine section and the assembly of claim 1, wherein the fan shaft drives the fan and the turbine shaft is driven by the turbine section.

13. An aircraft comprising the gas turbine engine of claim 12.

\* \* \* \* \*